(12) United States Patent
Park

(10) Patent No.: US 11,586,683 B2
(45) Date of Patent: Feb. 21, 2023

(54) METHODS, SYSTEMS AND RECORDING MEDIUMS FOR MANAGING CONVERSATION CONTENTS IN MESSENGER

(71) Applicant: LINE Corporation, Tokyo (JP)

(72) Inventor: Do Young Park, Seongnam-si (KR)

(73) Assignee: LINE CORPORATION, Tokyo (JP)

( * ) Notice: Subject to any disclaimer, the term of this patent is extended or adjusted under 35 U.S.C. 154(b) by 420 days.

(21) Appl. No.: 14/838,859

(22) Filed: Aug. 28, 2015

(65) Prior Publication Data

US 2016/0224549 A1   Aug. 4, 2016

(30) Foreign Application Priority Data

Feb. 3, 2015 (KR) .................. 10-2015-0016663

(51) Int. Cl.
*G06F 16/93* (2019.01)
*H04L 51/04* (2022.01)
*H04L 51/216* (2022.01)

(52) U.S. Cl.
CPC .............. *G06F 16/93* (2019.01); *H04L 51/04* (2013.01); *H04L 51/216* (2022.05)

(58) Field of Classification Search
CPC .... G06F 17/30011; G06F 16/93; H04L 51/04; H04L 51/216
USPC .................................. 707/812; 709/206, 207
See application file for complete search history.

(56) References Cited

U.S. PATENT DOCUMENTS

| | | | |
|---|---|---|---|
| 7,509,388 B2 | 3/2009 | Allen et al. | |
| 10,621,681 B1* | 4/2020 | Ledet | G06F 16/168 |
| 2002/0143776 A1* | 10/2002 | Hirose | G06Q 10/10 |
| 2004/0230650 A1* | 11/2004 | Vambenepe | G06Q 30/06 |
| | | | 709/204 |
| 2007/0198648 A1* | 8/2007 | Allen | G06Q 10/109 |
| | | | 709/207 |
| 2008/0168146 A1* | 7/2008 | Fletcher | H04L 51/36 |
| | | | 709/206 |

(Continued)

FOREIGN PATENT DOCUMENTS

| | | |
|---|---|---|
| CN | 101202716 A | 6/2008 |
| CN | 103809905 A | 5/2014 |

(Continued)

OTHER PUBLICATIONS

Korean Office Action issued in Korean Patent Application No. 10-2015-0016663, dated Oct. 20, 2015.

(Continued)

*Primary Examiner* — Tony Mahmoudi
*Assistant Examiner* — Kamal K Dewan
(74) *Attorney, Agent, or Firm* — Harness, Dickey & Pierce, P.L.C.

(57) ABSTRACT

In a conversation contents management method for a conversation contents management system including at least one processor and a memory, a conversation party, conversation contents, and a conversation time included in a conversation section determined by at least one of a start point and an end point selected by a user are identified. The conversation section including the identified conversation party, conversation contents, and conversation time are stored in the memory as a unit conversation.

19 Claims, 10 Drawing Sheets

(56) References Cited

U.S. PATENT DOCUMENTS

| | | | |
|---|---|---|---|
| 2010/0267369 A1* | 10/2010 | Lim | H04L 12/1822 455/414.1 |
| 2011/0119599 A1* | 5/2011 | Klassen | H04L 51/046 715/758 |
| 2011/0307791 A1* | 12/2011 | Pierre | G06F 16/9535 715/736 |
| 2012/0278388 A1* | 11/2012 | Kleinbart | G06Q 10/06 709/204 |
| 2012/0317499 A1* | 12/2012 | Shen | G06Q 10/107 715/752 |
| 2014/0013249 A1* | 1/2014 | Moeinifar | H04L 51/00 715/758 |
| 2014/0067977 A1* | 3/2014 | Rasmussen | H04L 51/10 709/206 |
| 2014/0136989 A1* | 5/2014 | Choi | G06F 3/0485 715/752 |
| 2014/0222924 A1* | 8/2014 | Rasmussen | G06Q 10/107 709/204 |
| 2014/0280288 A1* | 9/2014 | Hwang | G06F 16/332 707/766 |
| 2015/0019665 A1* | 1/2015 | Linner | H04W 4/14 709/206 |
| 2015/0033155 A1* | 1/2015 | Camacho | H04L 51/32 715/758 |
| 2015/0358270 A1* | 12/2015 | Jacobs | G06Q 10/107 715/752 |
| 2016/0065520 A1* | 3/2016 | Puranik | G06Q 10/00 715/752 |
| 2016/0110779 A1* | 4/2016 | Gu | G06Q 30/0282 705/14.54 |
| 2016/0173428 A1* | 6/2016 | Balasubramanian | G06Q 30/0255 709/206 |
| 2016/0380929 A1* | 12/2016 | Katis | H04L 12/1831 348/14.06 |
| 2017/0126608 A1* | 5/2017 | Friend | G06F 3/0486 |
| 2018/0159810 A1* | 6/2018 | Buchheit | G06Q 10/10 |
| 2018/0352072 A1* | 12/2018 | Christie | G06Q 10/107 |

FOREIGN PATENT DOCUMENTS

| | | |
|---|---|---|
| CN | 104050219 A | 9/2014 |
| JP | 2012-014210 A | 1/2012 |
| JP | 2014-35770 A | 2/2014 |
| JP | 2014-044723 A | 3/2014 |
| JP | 2014-096798 A | 5/2014 |
| KR | 2002-0074303 A | 9/2002 |
| KR | 10-0873804 B1 | 12/2008 |
| KR | 10-2010-0007228 | 1/2010 |
| KR | 1020130038477 A | 4/2013 |
| KR | 10-2014-0060739 | 5/2014 |

OTHER PUBLICATIONS

International Search Report dated May 30, 2016 for International Application No. PCT/KR2016/000384.
CA Office Action dated Jun. 15, 2020 in Chinese Application No. 201680008316.2.
Office Action dated Oct. 8, 2019 in Japanese Patent Application No. 2017-539304.
CA Office Action dated May 26, 2020 in Japanese Patent Application No. 2017-539304.
Japanese Office Action dated Sep. 14, 2021, corresponding to Japanese Patent Application No. 2020-168904.
Japanese Office Action dated Dec. 13, 2022 in Japanese Patent Application No. 2020-168904.

* cited by examiner

METHODS, SYSTEMS AND RECORDING MEDIUMS FOR MANAGING CONVERSATION CONTENTS IN MESSENGER

CROSS-REFERENCE TO RELATED APPLICATIONS

This application claims priority under 35 U.S.C. § 119 to Korean Patent Application No. 10-2015-0016663 filed Feb. 3, 2015, in the Korean Intellectual Property Office, the entire contents of which are incorporated herein by reference.

BACKGROUND

Field

Example embodiments of inventive concepts described herein relate to technology for storing and managing conversation contents of an instant messenger.

Description of Related Art

An instant messenger is a communication tool capable of sending and receiving messages and/or data in real time. Instant messengers are widely used in mobile environments of mobile communication terminals as well as at personal computers (PCs).

Disclosed in the KR patent publication No. 2002-0074303 are, for example, a mobile messenger service system and method for a portable terminal using a wireless communication network to provide a messenger service between mobile messengers installed on the portable terminals.

A conventional instant messenger may provide a chatting service, which allows users to chat by text, voice, and the like, and a data transmission service, which transmits and receives pictures, videos, music, and the like.

SUMMARY

Example embodiments of inventive concepts provide methods, systems, and/or non-transitory computer-readable storage mediums, capable of storing conversation contents in the format of document.

Furthermore, example embodiments of inventive concepts provide methods, systems, and/or non-transitory computer-readable storage mediums, capable of more simply appointing and storing one or more sections of conversation contents which a user intends to store.

Example embodiments of inventive concepts provide methods, systems, and/or non-transitory computer-readable storage mediums, capable of managing stored conversation contents using dedicated viewers.

At least one example embodiment of inventive concepts is directed to provide a conversation contents management method for a conversation contents management system including at least one processor and a memory, the conversation contents management method including: identifying a start point and an end point of a conversation section on a conversation screen of a messenger; specifying a conversation party, conversation contents, and a conversation time at each of the start point and the end point; and storing, in the memory, the specified conversation party, conversation contents, and conversation time for each of the start point and the end point as a conversation unit.

At least one other example embodiment of inventive concepts provides a non-transitory computer-readable record medium including computer-executable instructions that, when executed, cause a computer system to execute a conversation contents management method for a conversation contents management system including at least one processor and a memory, the conversation contents management method including: identifying a start point and an end point of a conversation section on a conversation screen of a messenger; specifying a conversation party, conversation contents, and a conversation time at each of the start point and the end point; and storing, in the memory, the specified conversation party, conversation contents, and conversation time for each of the start point and the end point as a conversation unit.

At least one other example embodiment of inventive concepts provides a conversation contents management device including a processor configured to identify a start point and an end point of a conversation section based on a touch operation on a conversation screen of a messenger; and a memory configured to store a conversation party, conversation contents, and a conversation time for each of the start point and the end point as a conversation unit.

At least one other example embodiment provides a conversation contents management method for a conversation contents management system including at least one processor and a memory, the conversation contents management method comprising: identifying a conversation party, conversation contents, and a conversation time for at least a start point and an end point of a conversation section selected by a user; and storing, in the memory in connection with at least one conversation unit, the conversation section including the identified conversation party, conversation contents, and conversation time for at least the start point and the end point.

The storing may include storing the at least one conversation unit based on the start point and the end point.

The method may further include setting a conversation unit, from among the at least one conversation unit, corresponding to a selected area of a conversation screen as the start point of the conversation section.

The method may further include selecting the start point and the end point of the conversation section in response to a touch operation on a conversation screen.

The storing may further include storing the conversation section in a document format.

The storing may further include storing data included in the conversation section in connection with the at least one conversation unit.

The storing may further include storing the conversation section on a client configured to execute a messenger function.

The method may further include calling at least one of a messenger service, a mail service, a messaging service, and a social networking service (SNS) for sharing the stored conversation section.

The method may further include displaying the stored conversation section in a dedicated viewer having a viewer function.

The method may further include: creating a layout based on the conversation party and the conversation time; wherein the displaying displays the created layout.

The method may further include at least one of: classifying and managing the stored conversation section through the dedicated viewer based on at least one reference; creating and editing a management box folder for managing the stored conversation section; searching for the stored conversation section; deleting the stored conversation section; associating a tag with the stored conversation section; calling a messenger function for communicating with a party associated with the stored conversation section; and sharing the stored conversation section.

At least one other example embodiment provides a non-transitory computer-readable storage medium including computer-executable instructions that, when executed, cause a conversation contents management system including at least one processor and a memory, to perform a conversation contents management method comprising: identifying a conversation party, conversation contents, and a conversation time for at least a start point and an end point of a conversation section selected by a user; and storing, in the memory in connection with at least one conversation unit, the conversation section including the identified conversation party, conversation contents, and conversation time for at least the start point and the end point.

At least one other example embodiment provides a conversation contents management device including a memory having computer-readable instructions stored therein; and at least one processor. The at least one processor is configured to execute the computer-readable instructions to: identify a conversation party, conversation contents, and a conversation time for at least a start point and an end point of a conversation section selected by a user; and store, in the memory in connection with at least one conversation unit, the conversation section including the identified conversation party, conversation contents, and conversation time for at least the start point and the end point.

The at least one processor may be further configured to store, in the memory, the conversation section in a document format.

The at least one processor may be further configured to store, in the memory, data included in the conversation section in connection with the at least one conversation unit.

The at least one processor may be further configured to call at least one of a messenger service, a mail service, a messaging service, and a social networking service for sharing the stored conversation section.

The at least one processor may be further configured to call a dedicated viewer having a viewer function to view the stored conversation section.

The at least one processor may be further configured to: create a layout based on the conversation party and the conversation time; and display the created layout via the dedicated viewer.

The at least one processor may be further configured to at least one of: classify and manage the stored conversation section through the dedicated viewer based on at least one reference; create and edit a management box folder for managing the stored conversation section; search for the stored conversation section; delete the stored conversation section; associate a tag with the stored conversation section; call a messenger function for communicating with a party associated with the stored conversation section; and share the stored conversation section.

At least one other example embodiment provides a conversation contents management method for a conversation contents management system including at least one processor and a memory, the conversation contents management method comprising: identifying a conversation party, conversation contents, and a conversation time included in a conversation section determined by at least one of a start point and an end point selected by a user; and storing, in the memory as a unit conversation, the conversation section including the identified conversation party, conversation contents, and conversation time associated to the conversation section.

According to at least some example embodiments, the storing may include storing the conversation section as the unit conversation based on the start point and the end point.

The method may further include setting the conversation section which includes a start point as a selected area of a conversation screen.

The method may further include selecting the start point and the end point in response to a touch operation on a conversation screen.

According to at least some example embodiments, the storing may further include: storing the conversation section in a document format; storing data included in the conversation section in connection with the unit conversation; and/or storing the conversation section as the unit conversation on a client configured to execute a messenger function.

According to at least some example embodiments, the method may further include calling at least one of a messenger service, a mail service, a messaging service, and a social networking service (SNS) for sharing the stored conversation section.

The method may further include displaying the stored conversation section in a dedicated viewer having a viewer function. The method may further include: creating a layout based on the conversation party and the conversation time associated with the stored conversation section. The displaying may display the created layout.

The method may further include at least one of: classifying and managing the stored conversation section through the dedicated viewer based on at least one reference; creating and editing a management box folder for managing the stored conversation section; searching for the stored conversation section; deleting the stored conversation section; associating a tag with the stored conversation section; calling a messenger function for communicating with a party associated with the stored conversation section; and sharing the stored conversation section.

At least one other example embodiment provides a non-transitory computer-readable storage medium including computer-executable instructions that, when executed, cause a conversation contents management system including at least one processor and a memory, to perform a conversation contents management method comprising: identifying a conversation party, conversation contents, and a conversation time included in a conversation section determined by at least one of a start point and an end point selected by a user; and storing, in the memory as a unit conversation, the conversation section including the identified conversation party, conversation contents, and conversation time associated with the stored conversation section.

At least one other example embodiment provides a conversation contents management device comprising: a memory having computer-readable instructions stored therein; and at least one processor. The at least one processor is configured to execute the computer-readable instructions to: identify a conversation party, conversation contents, and a conversation time included in a conversation section determined by at least one of a start point and an end point selected by a user; and store, in the memory as a unit conversation, the conversation section including the identified conversation party, conversation contents, and conversation time associated with the stored conversation section.

The at least one processor may be configured to store, in the memory, the conversation section as the unit conversation in a document format.

The at least one processor may be further configured to store, in the memory, data included in the conversation section in connection with the unit conversation.

The at least one processor may be further configured to call at least one of a messenger service, a mail service, a messaging service, and a social networking service for sharing the stored conversation section.

The at least one processor may be further configured to call a dedicated viewer having a viewer function to view the stored conversation section.

The at least one processor may be further configured to: create a layout based on the conversation party and the conversation time associated with the stored conversation section; and display the created layout via the dedicated viewer.

The at least one processor is further configured to at least one of: classify and manage the stored conversation section through the dedicated viewer based on at least one reference; create and edit a management box folder for managing the stored conversation section; search for the stored conversation section; delete the stored conversation section; associate a tag with the stored conversation section; call a messenger function for communicating with a party associated with the stored conversation section; and share the stored conversation section.

BRIEF DESCRIPTION OF THE FIGURES

Example embodiments will become apparent from the following description with reference to the following figures, wherein like reference numerals refer to like parts throughout the various figures unless otherwise specified, and wherein.

DETAILED DESCRIPTION

Figure 1:
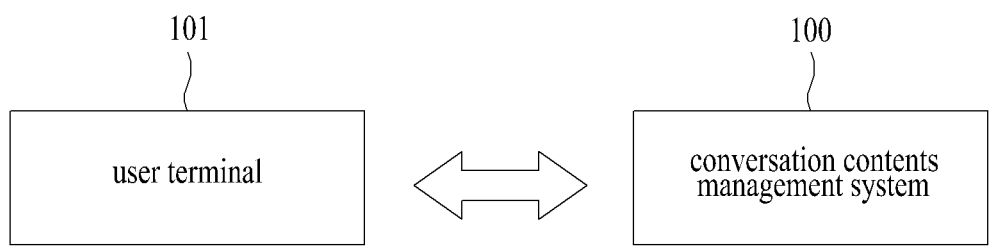
FIG. 1 is a diagram schematically illustrating a relationship between a user terminal and a conversation contents management system, according to an example embodiment of inventive concepts.

Example embodiments will be described in detail with reference to the accompanying drawings. Inventive concepts, however, may be embodied in various different forms, and should not be construed as being limited only to the illustrated embodiments. Rather, example embodiments are provided as examples so that this disclosure will be thorough and complete, and will fully convey the concept of inventive concepts to those skilled in the art. Accordingly, known processes, elements, and techniques are not described with respect to some of example embodiments of inventive concepts. Unless otherwise noted, like reference numerals denote like elements throughout the attached drawings and written description, and thus descriptions will not be repeated. In the drawings, the sizes and relative sizes of layers and regions may be exaggerated for clarity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of inventive concepts.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of inventive concepts. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

In the description below, it will be understood that when an element such as a layer, region, substrate, plate, or member is referred to as being "on" another element, it can be directly on the other element or intervening elements may be present. In contrast, the term "directly" means that there are no intervening elements.

At least some example embodiments of inventive concepts relate to technology for storing and managing conversation contents of instant messengers, and more particularly, to methods, systems, and/or non-transitory computer-readable recording mediums, capable of selecting (or, alternatively, appointing or identifying) a section of conversation contents, which a user intends to store, and storing the conversation contents in the selected section in the format of document.

FIG. 1 is a diagram schematically illustrating a relationship between a user terminal and a conversation contents management system, according to an example embodiment of inventive concepts. In FIG. 1, there are illustrated a conversation contents management system 100 and a user terminal 101. In FIG. 1, an arrow may mean that data is transmitted and received between the conversation contents management system 100 and the user terminal 101 through a wired and/or wireless network.

The user terminal 101 may mean any and all terminal devices capable of connecting to a web/mobile site associated with the conversation contents management system 100, and capable of installing and executing a service-dedicated application, such as a PC, a notebook, a smart phone, a tablet, a wearable computer, and the like. Here, under the control of a web/mobile site or the dedicated application, the user terminal 101 may perform an overall operation of a service including service screen construction, data input, data transmission and reception, data storage, and the like.

The conversation contents management system 100 may be implemented on a messenger platform, which provides a messenger service and may provide an environment in which there is stored and managed conversation contents exchanged through a messenger with respect to the user terminal 101 being a client using a messenger service. In particular, for example, the conversation contents management system 100 may provide a function for selecting (or, alternatively, appointing or identifying) the section (start-end) of conversation contents, which a user intends to store on a messenger, and storing conversation contents in the selected section in the format of document.

The above-described conversation contents management system 100 may be implemented so as to be included in a platform of a messenger server (not illustrated) providing a messenger service. However, the scope and spirit of inventive concepts should not be limited to this example. For example, the conversation contents management system 100 may be implemented with a system independent of the messenger server to manage conversation contents in conjunction with the messenger server. The conversation contents management system 100 may be implemented in an application format in which some (or alternatively all) components thereof are installed on the user terminal 101 or may be implemented so as to be included in a platform providing a service at a client-server environment.

Figure 2:
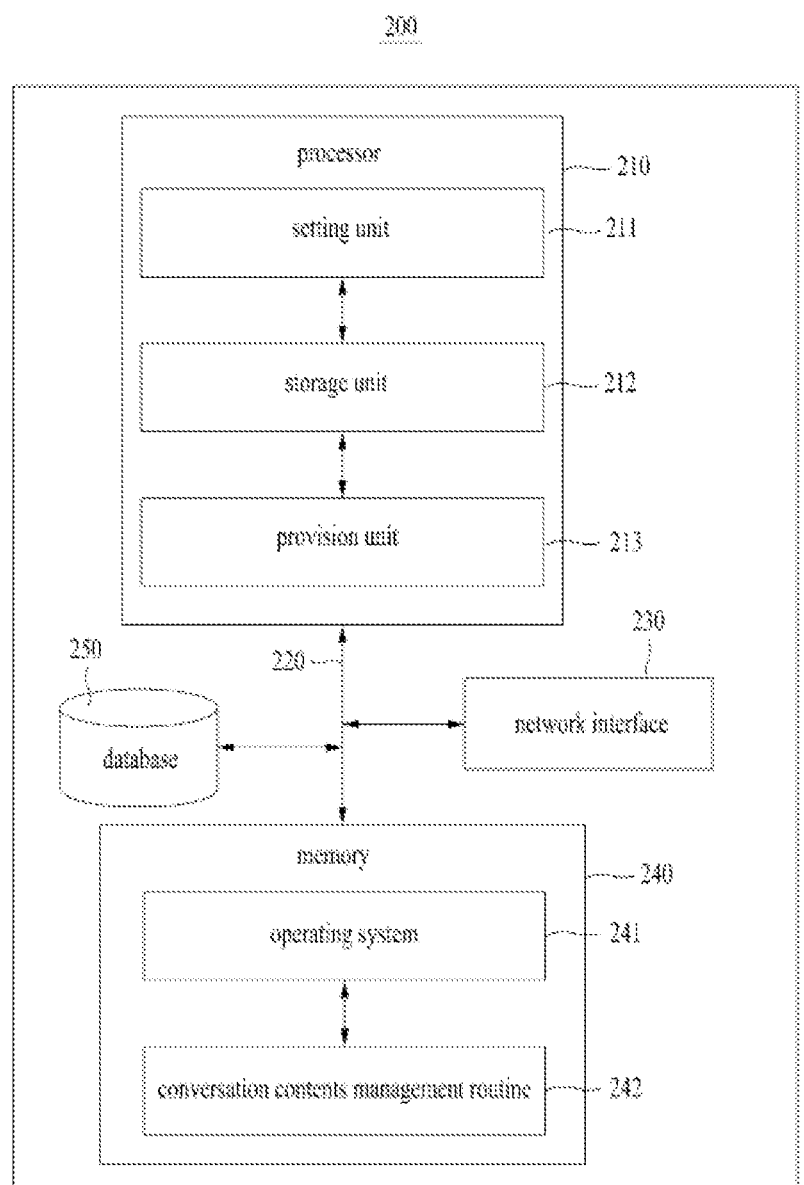
FIG. 2 is a block diagram illustrating an internal configuration of a conversation contents management system, according to an example embodiment of inventive concepts.

FIG. 2 is a block diagram illustrating an internal configuration of a conversation contents management system, according to an example embodiment of inventive concepts.

Figure 3:
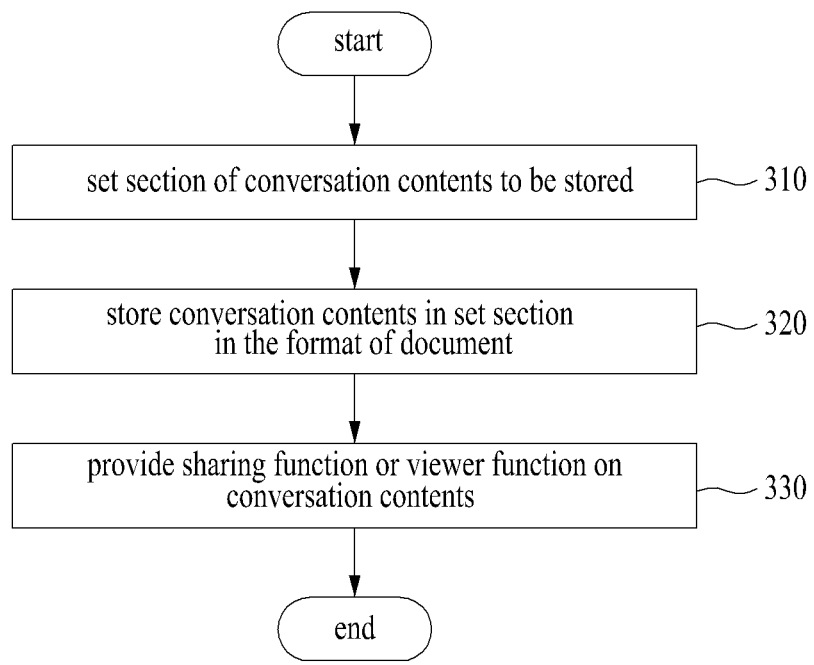
FIG. 3 is a flow chart illustrating a conversation contents management method according to an example embodiment of inventive concepts.

FIG. 3 is a flow chart illustrating a conversation contents management method according to an example embodiment of inventive concepts.

Referring to FIG. 2, a conversation contents management system 200 according to an example embodiment of inventive concepts may include a processor 210, a bus 220, a network interface 230, a memory 240, and database 250. The memory 240 may include an operating system 241 and a conversation contents management routine 242. The processor 210 may include a setting unit 211, a storage unit 212, and a provision unit 213. In other example embodiments, the conversation contents management system 200 may include components of which the number is more than that of FIG. 2. However, it is unnecessary to depict conventional components explicitly. For example, the conversation contents management system 200 may include any other components such as a display, a transceiver, and the like.

The memory 240 may be a computer-readable record medium and may include a random access memory (RAM), a read only memory (ROM), and a permanent mass storage device such as a disk drive. Stored in the memory 240 is program code for the operating system 241 and the conversation contents management routine 242. Such software components may be loaded from a computer-readable record medium, which is independent of the memory 240, using a drive mechanism (not illustrated). The computer-readable record medium independent of the memory 240 may include a computer-readable record medium, such as a floppy drive, a disk, a tape, a DVD/CD-ROM drive, a memory card, or the like. In at least some other example embodiments, software components may be loaded on the memory 240 through the network interface 230, not the computer-readable record medium.

The bus 220 may allow communication and data transmission to be performed between components of the conversation contents management system 200. The bus 220 may be implemented using a high-speed serial bus, a parallel bus, a storage area network (SAN), and/or any other appropriate communication technology.

The network interface 230 may be a computer hardware component for connecting the conversation contents management system 200 to a computer network. The network interface 230 may connect the conversation contents management system 200 to a computer network through a wired and/or wireless connection.

The database 250 may store and retain conversation contents selected by a user in connection (or association) with the user. Here, the conversation contents may be managed by a unit conversation. According to at least some example embodiments, the unit conversation refers to an element storing a conversation section determined based on a user's selection of a start point and/or an end point thereof. The unit conversation includes (stores) conversation parties, conversation contents, and conversation time associated with the conversation section, and it may be, for example, a file storing the conversation section.

The unit conversation may include a speaker (or, alternatively, user, user identifier or conversation partner), conversation contents (exchanged messages or data), and a conversation time. Images, pictures, files, and the like, transmitted during a conversation may be stored together when storing conversation contents. For example, in case of a sticker image, identification information (e.g., an ID and the like) of the sticker image may be stored as part of the conversation contents. Basically, conversation contents stored at the database 250 may be managed based on a storage time. Furthermore, the conversation contents may be classified and managed according to a date, a conversation partner, a tag, and the like.

In FIG. 2, an example embodiment of inventive concepts is exemplified with regard to the database 250 being part of the conversation contents management system 200. However, the scope and spirit of inventive concepts should not be limited to this example. For example, the database 250 may be omitted according to a system implementation manner or an environment, or the whole or a portion of the database 250 may be an external database implemented on a separate system.

The processor 210 may process an instruction of a computer program by performing a basic arithmetic operation, a logic operation, and an input/output operation of the conversation contents management system 200. The memory 240 or the network interface 230 may provide the instruction to the processor 210 through the bus 220. The processor 210 may be configured to execute program code for the setting unit 211, the storage unit 212, and the provision unit 213. The program code may be stored at a record device such as the memory 240.

The setting unit 211, the storage unit 212, and the provision unit 213 may be configured to perform steps 310 to 330 in FIG. 3.

Referring to FIG. 3, in step 310 the setting unit 211 may set the section of conversation contents, which the user intends to store, in response to a storage request from the user associated with the conversation contents. For example, the setting unit 211 may set a section (start-end) appointed by the user as a storage section by directly receiving an identification of a start and an end of the section to be stored from the user. For example, in response to selection by the user, the setting unit 211 may identify messages, corresponding to the start and the end of the section to be stored, from among conversation messages exchanged between the user and a conversation partner, and may set conversation contents ranging from a start message to an end message as the storage section. As another example, the setting unit 211 may set, as the storage section, a section ranging from a selected first message to a last message sent before a storage request. As a further example, the setting unit 211 may set, as the storage section, a section ranging from a first message received after connection of a conversation session to a selected message identified by a user. As still another example, the setting unit 211 may set, as the storage section, a section specified according to a storage request of a user (e.g., conversation contents of the day, conversation contents currently displayed on a messenger screen, all conversation contents exchanged after connection of the conversation session, and the like).

Still referring to FIG. 3, in step 320 the storage unit 212 may store conversation contents in the storage section set in step 310 in connection (or association) with a user. For example, the storage unit 212 may store conversation contents in a specific section in the format of document. For example, the storage unit 212 may store conversation contents in a variety of data formats such as HTML (hypertext markup language), a word document, and the like. If a start point and an end point are set as a storage section, the storage unit 212 may specify a conversation party (e.g., a profile image, a name, a telephone number, an ID, and the like), conversation contents, and a conversation time, for each point and may store the specified conversation party, conversation contents (or messages), and the conversation time, in connection (or association) with a unit conversation. For example, if a storage section on a messenger conversation screen is identified in response to a user touch, a conversation balloon corresponding to a start point and a conversation balloon corresponding to an end point may be specified in the storage section. Then, a conversation party and a conversation time of each conversation balloon may be stored together with the conversation contents. That is, for example, the storage unit 212 may store unit conversations in the storage section based on the start point and the end point. In particular, for example, the storage unit 212 may also store additional data (an image, a picture, a video, a file, and the like) sent during a conversation as a unit conversation. For example, in case of a sticker image, identification information (e.g., an ID and the like) and the like of the sticker image may be included and stored. In other words, for example, the storage unit 212 may store additional data included in conversation contents of a specific section in connection with conversation contents in a way such that all data exchanged during a conversation is expressed in the same or substantially the same manner as an actual messenger environment during a conversation. The storage unit 212 may store conversation contents in the appointed section on a client. Alternatively, a user may store conversation contents in the appointed section at database of a client; if needed, the user may, at any time, restore conversation contents in the specific section using information stored at the client. Accordingly, even though conversation contents are deleted from a service server of a messenger, conversation contents of a specific section appointed by the user may be retained and managed on the client.

Still referring to FIG. 3, in step 330 the provision unit 213 may provide a share function, a viewer function, and the like, associated with stored conversation contents. Here, the share function may enable direct use of stored conversation contents for a messenger, mail, messages, social networking services (SNS), and the like, and the viewer function may be a function for displaying stored conversation contents using a dedicated viewer. The dedicated viewer, which is a separate management tool for conversation contents, may manage stored conversation contents based on various references or methods, and may provide a search function based on a conversation partner and conversation contents through indexing the conversation contents. In particular, for example, the provision unit 213 may rearrange unit conversations of stored conversation contents based on a conversation party and/or a conversation time, and may display rearranged unit conversations through the dedicated viewer. In other words, for example, when stored conversation contents are displayed through the dedicated viewer, the provision unit 213 may again create and display a layout similar or substantially similar to a messenger screen based on a conversation party and a conversation time corresponding to a unit conversation. Furthermore, the dedicated viewer may provide a variety of management environments including functions for providing a link to a specific function or service through marking or tagging of a specific word or conversation. The dedicated viewer, which displays stored conversation contents, may be implemented by a function included in a messenger, or by a separate application working in conjunction with a messenger.

Accordingly, if a start point and an end point are set as a section of conversation contents to be stored, then the conversation contents may be put into a database based on a conversation (a speech balloon) of each point, thereby reducing and/or minimizing the amount of data, and enabling simpler rearranging and/or display of stored conversation contents on a viewer.

Figure 4:
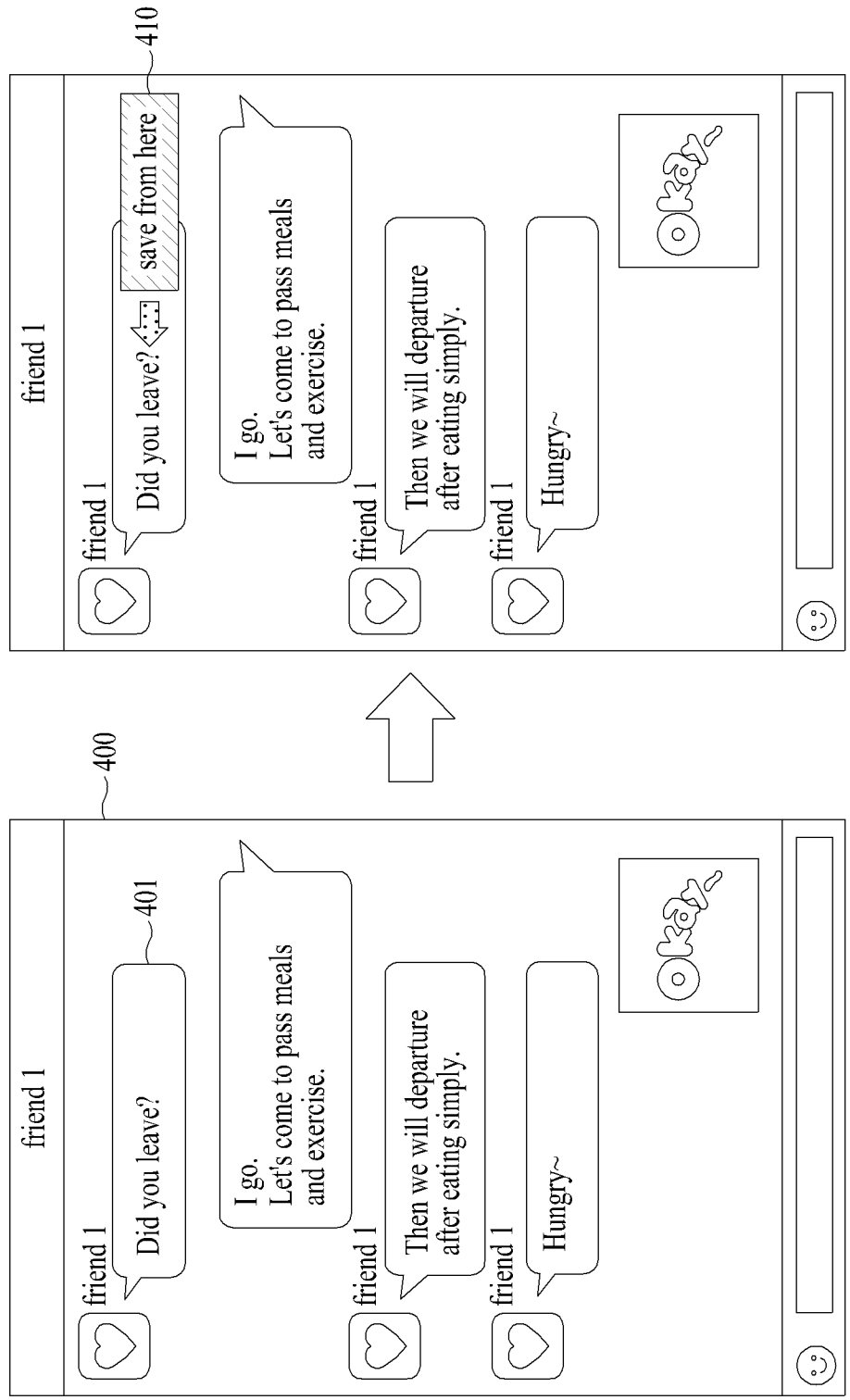
FIGS. 4 and 5 are diagrams for describing a process for identifying conversation contents to be stored, according to an example embodiment of inventive concepts.
Figure 5:
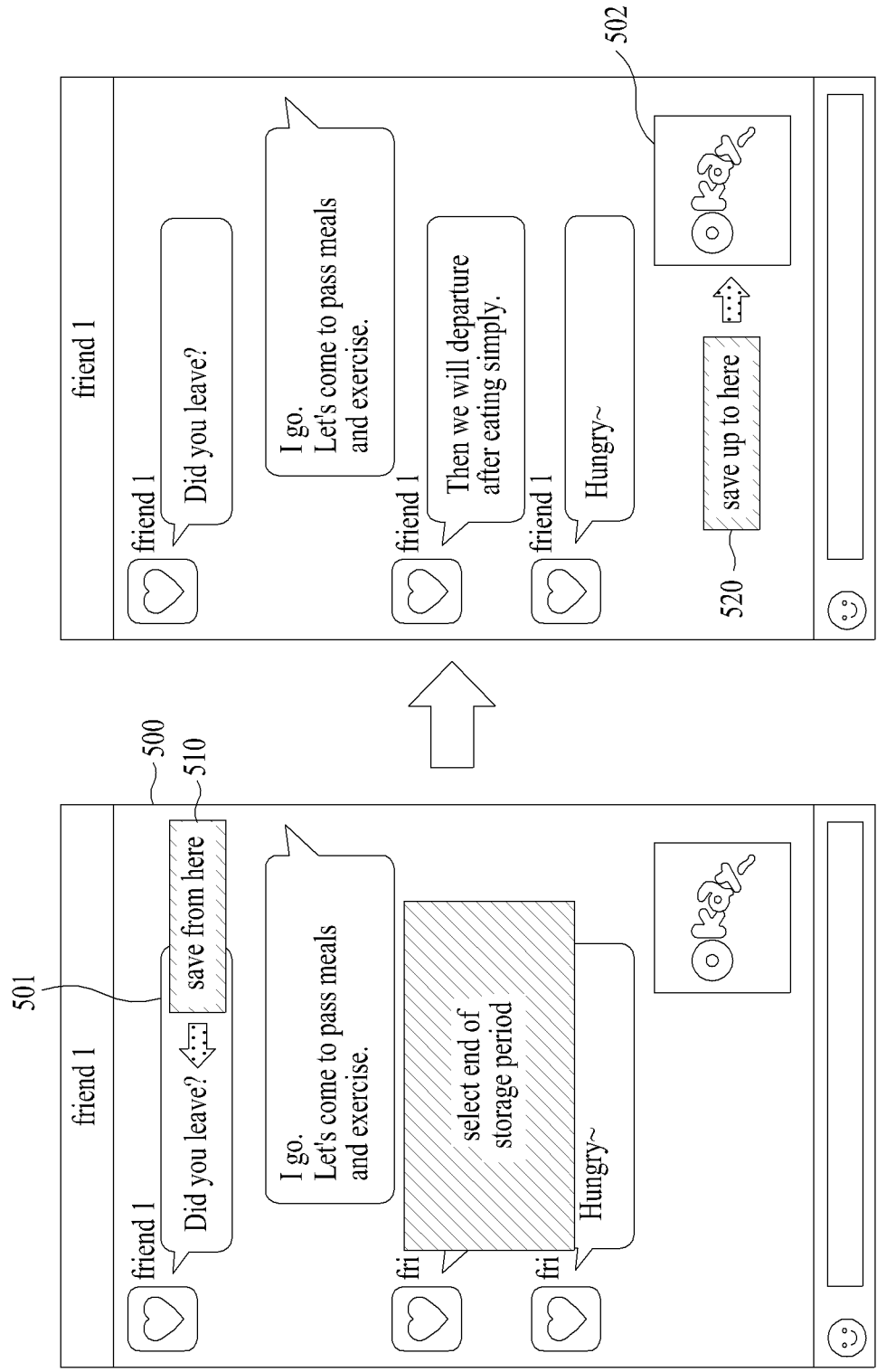

FIGS. 4 and 5 are diagrams for describing a process for selecting (or, alternatively, appointing or identifying) conversation contents to be stored, according to an example embodiment of inventive concepts. For example purposes, there will be described a manner in which a user stores conversation contents by appointing a specific message.

Referring to FIG. 4, a popup menu 410 for storing conversation contents may appear (or be displayed) if a specific message 401 in response to a long touch on a conversation screen 400 of a messenger. At this time, in response to user selection of the popup menu 410, a unit conversation included in conversation contents ranging from the specific message 401 to the last message of a corresponding conversation may be stored in the format of document.

As another example, as illustrated in FIG. 5, in response to sequential long touch of a start message 501 and an end message 502 of a section to be stored on a conversation screen 500 of a messenger, popup menus 510 and 520 for storing conversation contents may sequentially appear at the messages 501 and 502. At this time, in response to user selection of one of the popup menus 510 and 520, a unit conversation included in conversation contents ranging from the start message 501 to the end message 502 may be stored in the format of document.

The above-described conversation appointment manner may be exemplary, not limited thereto. A conversation section may be appointed and stored according to user selection or system setting even though any other manner(s) different from the above-described manner is used.

FIGS. 6 to 9 are diagrams for describing a process for using stored conversation contents, according to an example embodiment of inventive concepts.

Figure 6:
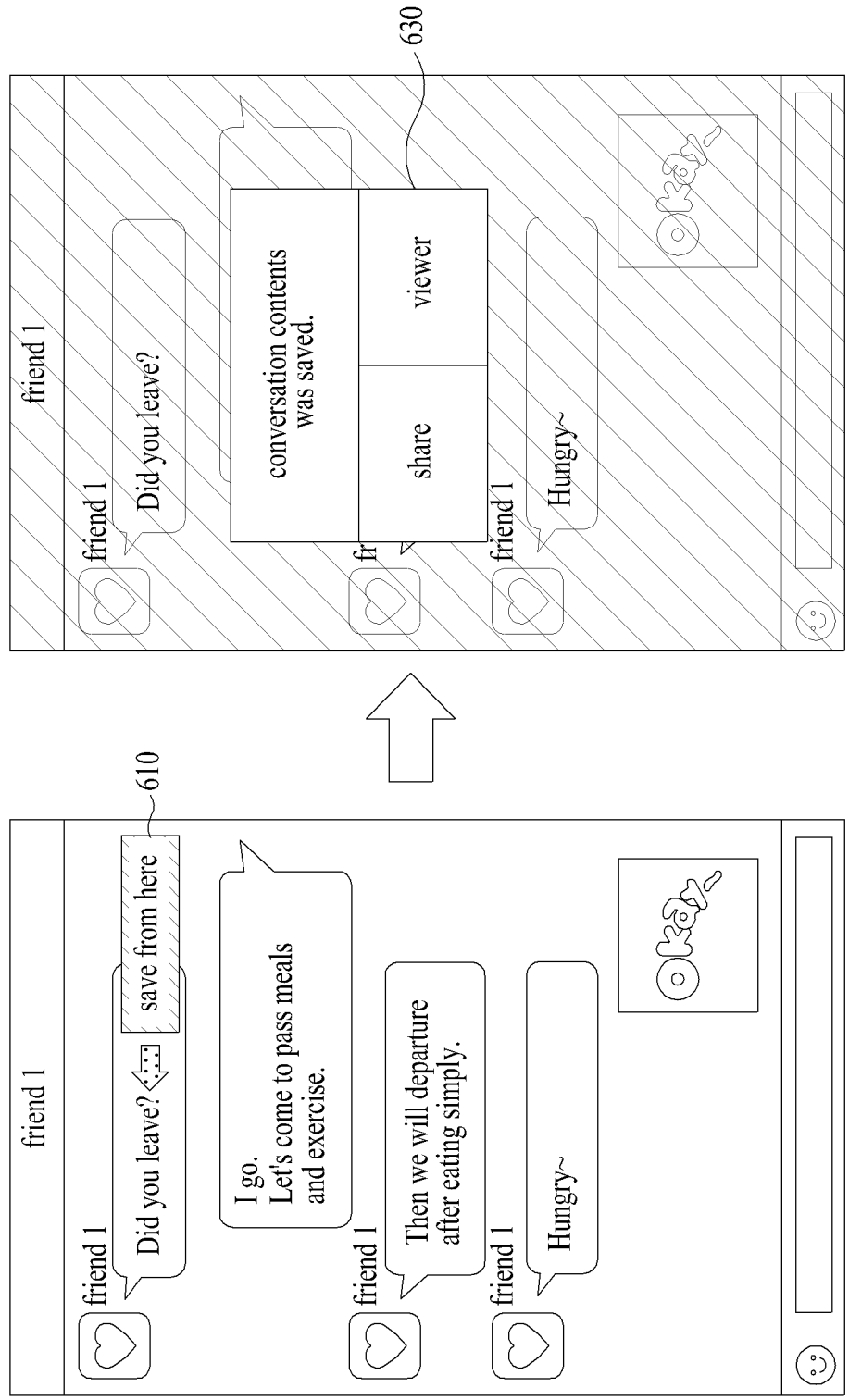
FIGS. 6 to 9 are diagrams for describing a process for using stored conversation contents, according to an example embodiment of inventive concepts.

Referring to FIG. 6, in response to user selection of a popup menu 610 displayed on a specific message, conversation contents in a specific section may be stored. If storing of conversation contents is completed, then a menu list 630 for using corresponding conversation contents may be provided as a popup screen. Here, the menu list 630 may include at least one of a "share" menu for sharing conversation contents or a "viewer" menu for displaying conversation contents through a dedicated viewer.

Figure 7:
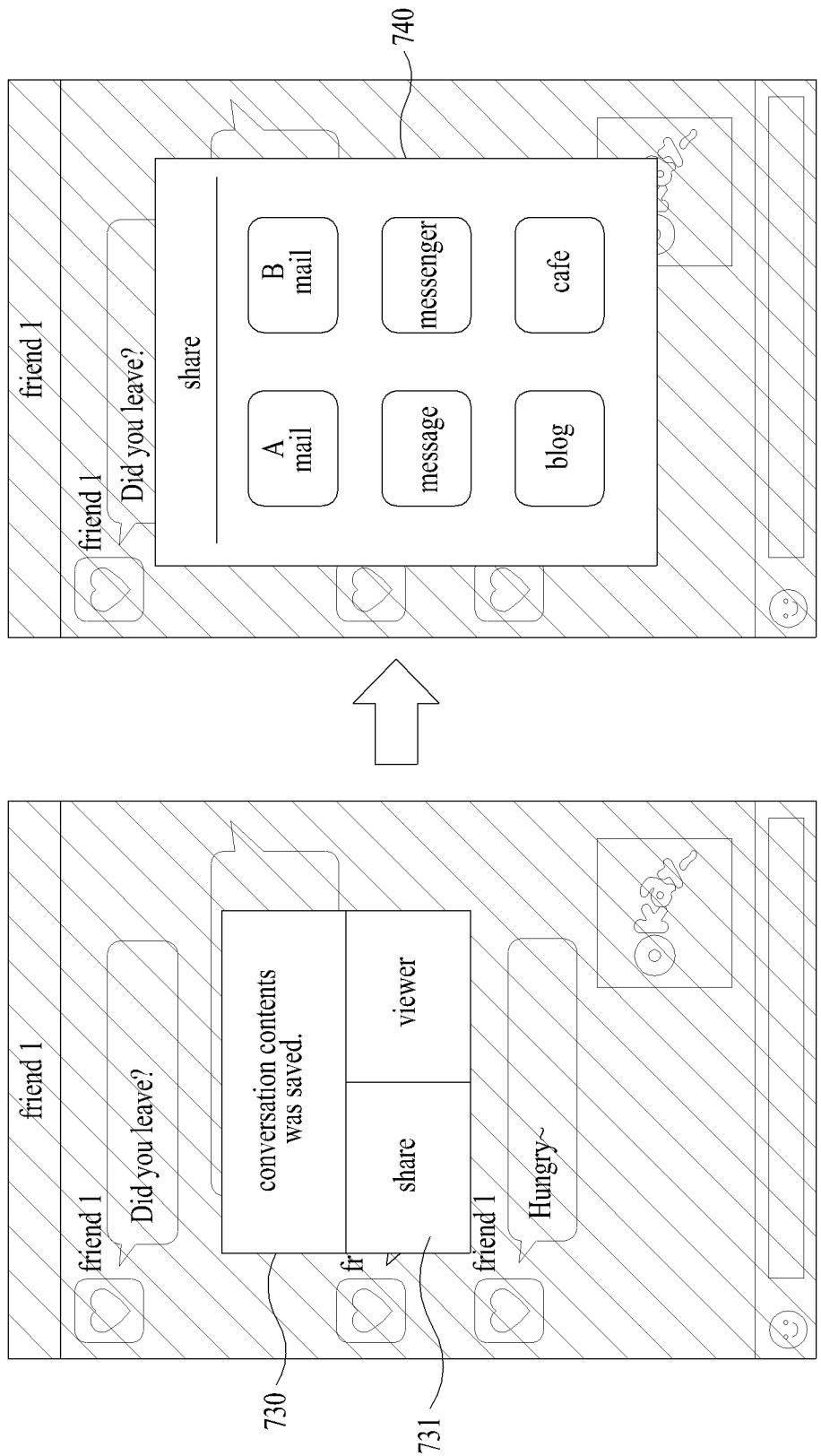

Referring to FIG. 7, in response to user selection of a "share" menu 731 from a menu list 730 after storing conversation contents, a service list 740 capable of being called to share corresponding conversation contents may be provided by the device. The service list 740 may include menus for calling a service, such as a messenger, mail, messaging, SNS, or the like, making it possible to share conversation contents stored in the format of document.

According to one or more example embodiments of inventive concepts, conversation contents of a messenger may be stored in the format of document to which a screen style of the messenger is applicable, thereby enabling sharing of conversation contents in a format that is the same or substantially the same as that of an actual conversation screen of a messenger.

Figure 8:
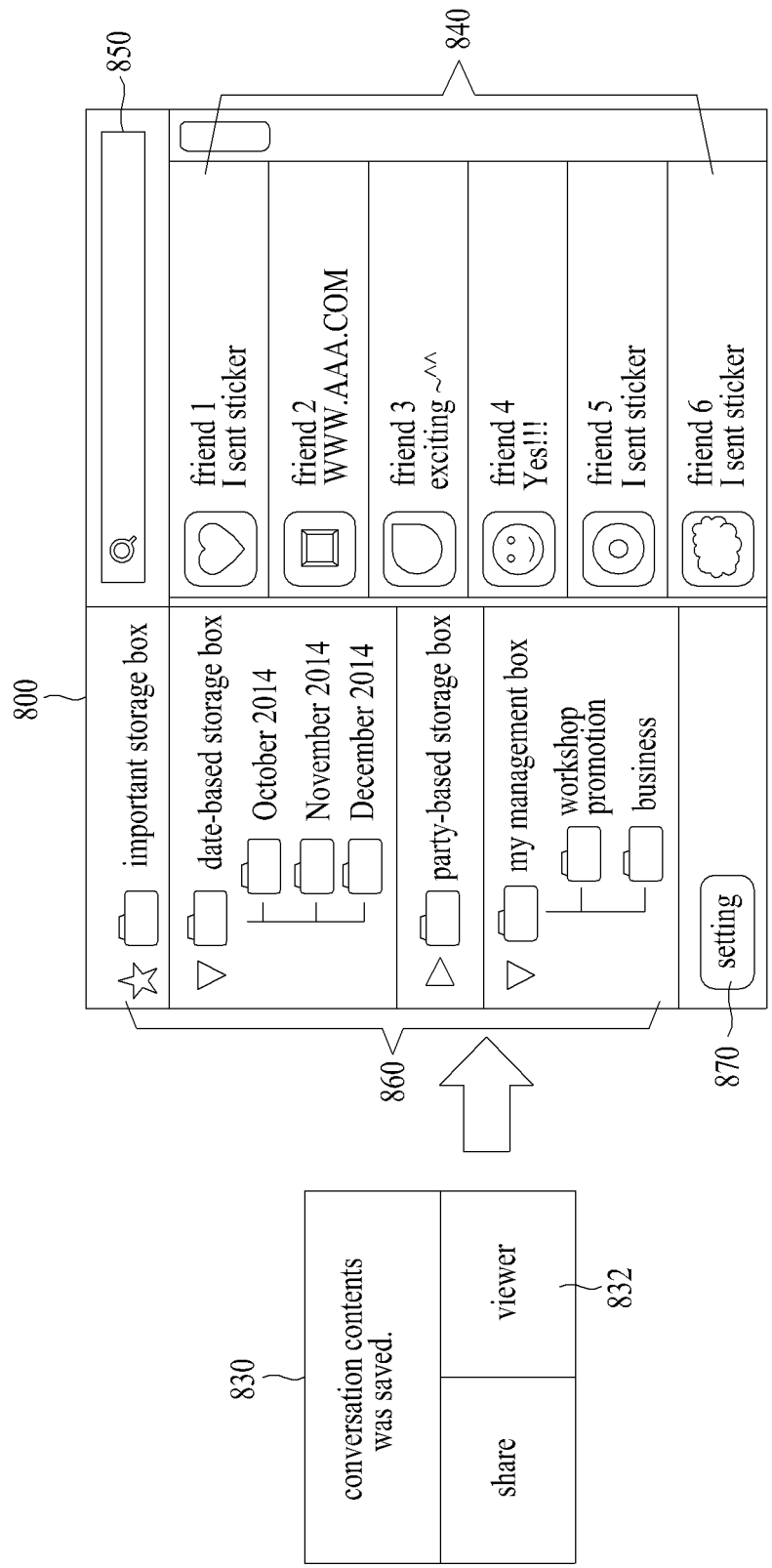

Meanwhile, in response to user selection of a "viewer" menu from a menu list 830 displayed (or appearing) after storing conversation contents, as illustrated in FIG. 8, a dedicated viewer screen 800 for checking stored conversation contents may be displayed.

Referring to FIG. 8, the dedicated viewer screen 800 may include an item screen 840 in which conversation contents stored in connection (or association) with a user are listed. All stored conversation contents may be displayed at the item screen 840 when first entering the dedicated viewer screen 800. In this case, conversation contents may be listed such that the most recently stored conversation contents are located at the top of the dedicated viewer screen 800.

The dedicated viewer screen 800 may provide a search function 850 for searching for a conversation partner from a conversation contents list using a name, a telephone number, an ID, and the like, and/or for searching for conversation contents using a keyword. Since the stored conversation contents are indexed, it may be possible to search for a specific conversation partner or conversation from a conversation contents list of the list screen 840 through the search function 850 of the dedicated viewer.

The dedicated viewer screen 800 may include a storage box list 860 in which stored conversation contents are classified according to various references for management. Basically, the storage box list 860 may include an important storage box for managing conversation contents to which an important tag is set, a date storage box for classifying and managing conversation contents based on a storage time, a conversation partner storage box for classifying and managing conversation contents based on a conversation partner, and the like.

Furthermore, the dedicated viewer screen 800 may provide a function enabling direct creation of a management box folder and direct management of conversation contents. To this end, the dedicated viewer screen 800 may provide a management box setting function 870, enables addition, revision, and deletion of the management box folder.

When a specific storage box is selected from the storage box list 860 of the dedicated viewer screen 800, a conversation contents list stored at the selected storage box may be displayed. In this case, a most recently stored conversation contents may be located at the top of a list.

Figure 9:
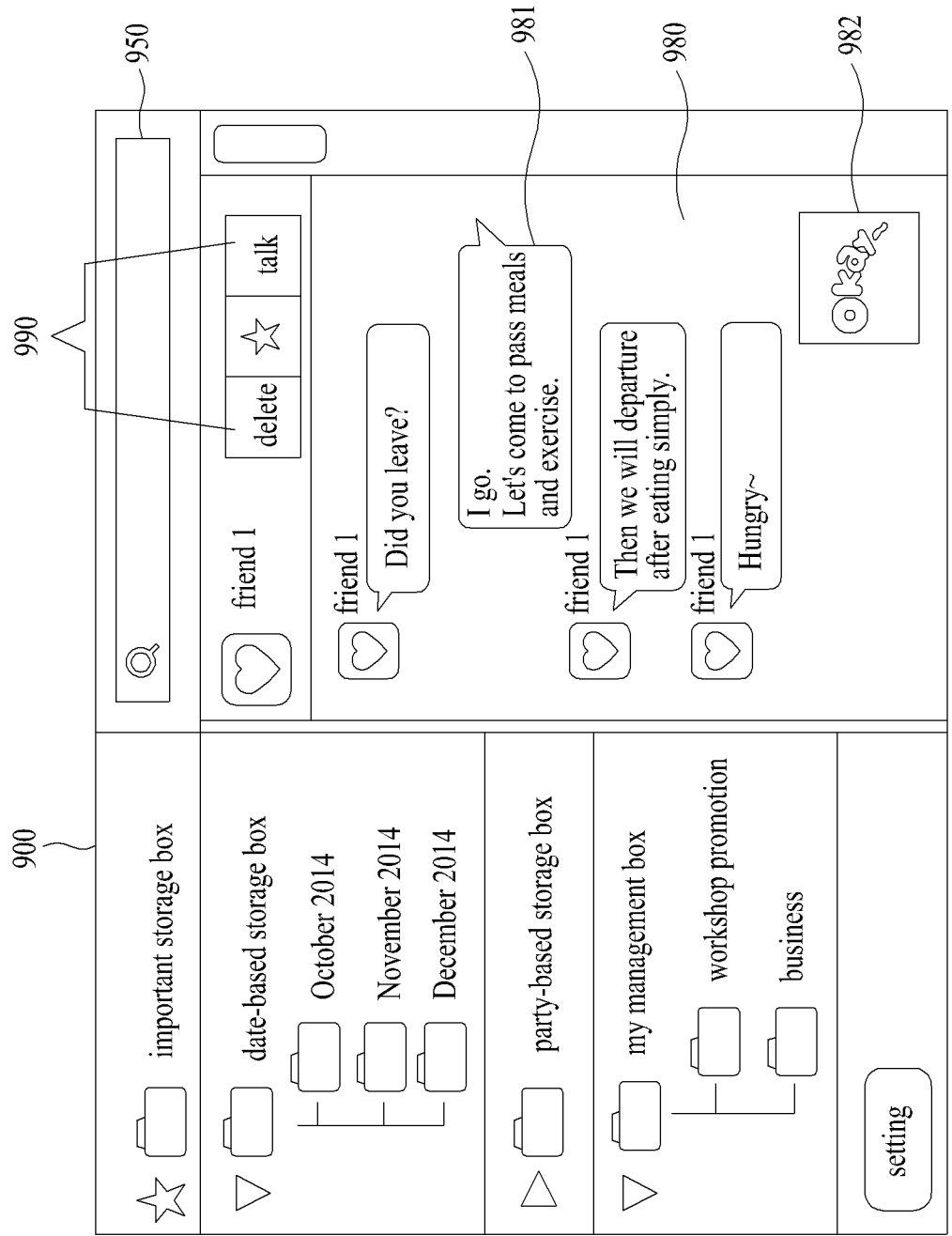

In response to user selection of specific conversation contents from the list screen 840, as illustrated in FIG. 9, conversation contents 980 stored in a document format may be displayed according to a screen style of a messenger. At this time, the conversation contents 980 stored in the format of document during a storage operation may be viewed in the same or substantially the same format as an actual conversation screen of a messenger by checking it on a dedicated viewer screen 900, thereby making it easier to view and/or check conversation contents.

The dedicated viewer screen 900 may provide a search function 950 for searching for specific contents in currently displayed conversation contents 980. Accordingly, in response to input of a keyword from a user, a message including the keyword may be searched for.

The dedicated viewer screen 900 may provide a menu list 990, which allows a profile image and a conversation name of a conversation partner to be displayed at an upper portion of the conversation contents 980 in displaying the conversation contents 980 and which is associated with the conversation contents 980. The menu list 990 may include a "delete" menu for deleting corresponding conversation contents, an "important" tag for setting an important tag to corresponding conversation contents to move it to an important storage box, a "conversation" menu for calling a messenger for conversation with a partner of corresponding conversation contents, a "share" menu for calling a service, such as a messenger, mail, messaging, a SNS, and the like, making it possible to share conversation contents, and the like.

In the dedicated viewer screen 900, it may be possible to set an important tag to the entire conversation contents 980 using an "important tag" menu of the menu list 990. Besides, the dedicated viewer screen 900 may support a function (e.g., a manner in which an important tag is automatically set in response to identifying long touch of a specific message) for setting an important tag to each message 981, with specific conversation contents 980 displayed.

In the case where displayed conversation contents 980 include an image, a picture, a video, a file, and the like, as at an actual conversation state of a messenger, the dedicated viewer screen 900 may display contents of corresponding additional data or may provide a link to a specific function or service. For example, if conversation contents 980 corresponds to a conversation where a moving animation sticker 982 is sent, an animation effect corresponding to the animation sticker 982 may be implemented on the dedicated viewer screen 900 when checking the conversation contents 980, and the dedicated viewer screen 900 may support a function enabling download of a corresponding item and/or moving to a sticker shop in selecting the animation sticker 982. Likewise, if the conversation contents 980 correspond to conversation where a URL is transmitted, then the dedicated viewer screen 900 may support a function enabling movement to a web page of the corresponding URL in response to selection of the URL during checking of the conversation contents 980. That is, for example, when stored conversation contents 980 are checked through a dedicated viewer, it may be possible to display an image, a picture, a video, a file, and the like, included in the conversation contents 980 in the same or substantially the same manner as an actual conversation environment of a messenger and/or to provide a link to a specific function and/or service.

According to one or more example embodiments of inventive concepts, it may be possible to share conversation contents stored in a document format more quickly through a messenger, mail, and the like, and/or to check and/or manage conversation contents using a separate dedicated viewer.

Some operations may be omitted from or added to the above-described example embodiments based on a detailed description of a conversation contents management system described with reference to FIGS. 1 to 10. Furthermore, two or more operations may be combined, and the order or positions of operations may be changed.

Exemplary screens illustrated in FIGS. 4 to 9 may be to help understanding of the scope and spirit of inventive concepts. However example embodiments should not be limited to these examples. A screen construction, a screen order, and the like may be variously changed or modified.

Figure 10:
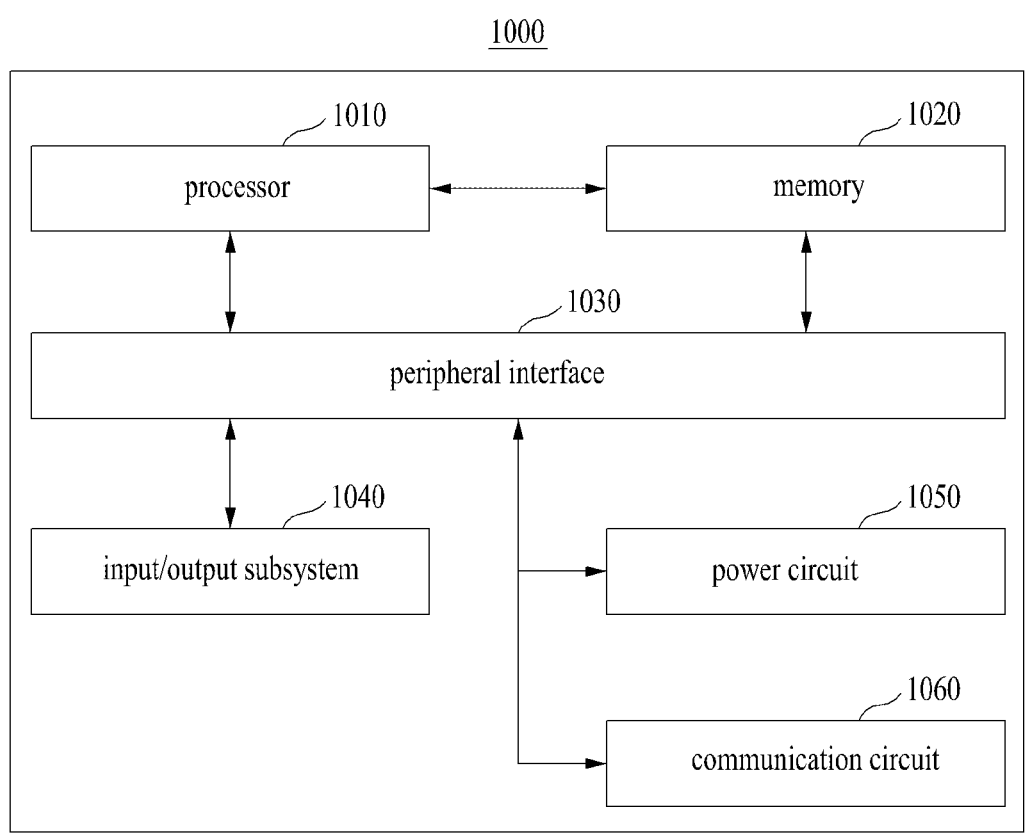
FIG. 10 is a block diagram schematically illustrating an internal configuration of a computer system according to an example embodiment of inventive concepts.

FIG. 10 is a block diagram schematically illustrating an internal configuration of a computer system, according to an example embodiment of inventive concepts.

As illustrated in FIG. 10, a computer system 1000 may include at least one processor 1010, a memory 1020, a peripheral interface 1030, an input/output subsystem 1040, a power circuit 1050, and a communication circuit 1060. Here, the computer system 1000 may be a user terminal and may include (or may be roughly divided into) an input unit for receiving a conversation section to be stored through a conversation screen of a messenger, a storage unit for storing a unit conversation included in the conversation section, and a control unit for controlling an overall operation of the computer system 1000 to share the stored conversation section or to display it using a dedicated viewer.

For example, the memory 1020 may include a high-speed random access memory (RAM), a magnetic disc, a static RAM, a dynamic RAM, a read only memory (ROM), a flash memory, or a nonvolatile memory. The memory 1020 may include a software module, a command set, or a variety of data necessary for an operation of the computer system. The processor 1010 may control an access to the memory 1020 from the processor 1010 or any other component (e.g., the peripheral interface 1030).

The peripheral interface 1030 may couple a peripheral input and/or output device of the computer system 1000 to the processor 1010 and the memory 1020. The processor 1010 may execute a software module or a command set stored at the memory 1020 to perform a variety of functions for the computer system 1000 and to process data.

The input/output subsystem 1040 may couple a variety of peripheral input/output devices to the peripheral interface 1030. For example, the input/output subsystem 1040 may include a controller for coupling a monitor, a keyboard, a mouse, a printer, or a peripheral device, such as a touch screen or a sensor, to the peripheral interface 1030. According to another aspect, peripheral input/output devices may be coupled to the peripheral interface 1030 without passing through the input/output subsystem 1040.

All or a part of components of a terminal may be powered by the power circuit 1050. For example, the power circuit 1050 may include a power management system, one or more power sources such as a battery or an alternating current (AC), a charging system, a power failure detection circuit, a power converter or inverter, a power status indicator, or any other components for power generation, management, and distribution.

The communication circuit 1060 may communicate with other computer system using at least one external port. As described above, the communication circuit 1060 may include a RF circuit and may communicate with other computer system by transmitting and receiving an RF signal known as an electromagnetic signal.

The computer system 1000 illustrated in FIG. 10 may be example. The computer system 1000 may not include some of components illustrated in FIG. 10, may further include components not illustrated in FIG. 10, or may be implemented such that two or more components are combined. For example, the computer system 1000 for a mobile terminal of a communication environment may include a touch screen, a sensor, and the like as well as components illustrated in FIG. 10, and the communication 1060 may include circuits for RF communications such as wireless-fidelity (Wi-Fi), 3G, long term evolution (LTE), Bluetooth, near field communication (NFC), Zigbee, and the like. Components capable of being included in the computer system 1000 may be implemented with hardware, including an integrated circuit specialized for one or more signal processing or an application, software, or a combination thereof.

Methods according to one or more example embodiments of inventive concepts may be implemented in the format of program instruction executable through various computer systems and may be recorded at a computer-readable medium. In particular, a program according to one or more example embodiments of inventive concepts may be a PC-based program or an application dedicated to a mobile terminal. A messenger application to which one or more example embodiments of inventive concepts may be applied may be installed on a user terminal through a file which a file distribution system provides. For example, the file distribution system may include a file transfer unit (not illustrated) which transfers the file in response to a request of a user terminal.

As such, according to one or more example embodiments of inventive concepts, conversation contents of a messenger may be stored in the format of document and by a unit conversation, thereby making it possible to view and manage conversation contents as a screen style of the messenger. Furthermore, according to one or more example embodiments of inventive concepts, conversation contents to be stored are stored by simply appointing a start and an end of the conversation contents, thereby improving convenience and practicality in comparison with conventional storage methods in which the whole conversation contents are stored or a user copies and pastes conversation contents to be stored. According to one or more example embodiments of inventive concepts, conversation contents may be more easily checked and/or used at a client-centered environment by storing conversation contents on a client and managing it through a dedicated viewer.

The units (or devices) described herein may be implemented using hardware components, software components, and/or a combination thereof. For example, devices and components described therein may be implemented using processing circuitry such as, but not limited to, a processor, a controller, an arithmetic logic unit (ALU), a digital signal processor, a microcomputer, a field programmable gate array (FPGA), a programmable logic unit, a microprocessor or any other device capable of responding to and executing instructions in a defined manner. The processing circuitry and/or hardware devices (also sometimes referred to herein as a processing device) may be configured as special purpose processing circuitry and/or hardware devices to perform functions illustrated in one or more of the flow charts or sequence diagrams discussed herein.

A processing device may run an operating system (OS) and one or more software applications that run on the OS. The processing device also may access, store, manipulate, process, and create data in response to execution of the software. For the sake of easy understanding, one or more example embodiments of inventive concepts is/are exemplified as one processing device is used; however, one skilled in the art will appreciate that a processing device may include multiple processing elements and multiple types of processing elements. For example, a processing device may include multiple processors or a processor and a controller. In addition, other processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

Methods according to one or more example embodiments may be implemented in the format of program instruction executable through various computing devices and may be recorded in a non-transitory computer-readable storage medium. The computer-readable medium may also include program instructions, data files, data structures, and the like independently or in the format of combination. The program instructions recorded in the medium may be those specially designed and constructed for the embodiment or may be well-known and available to those skilled in the computer software arts. Examples of the computer-readable medium may include magnetic media such as hard disks, floppy disks, and magnetic tape; optical media such as CD ROM disks and DVD; magneto-optical media such as floptical disks; and hardware devices that are specialized to store and perform program instructions, such as read-only memory (ROM), random access memory (RAM), flash memory, and the like. Examples of program instructions may include both machine code produced by a compiler and high-level code executed by the computer using an interpreter. The described hardware devices may be configured to operate as one or more modules or units to perform the operations of the above-described example embodiments, and vice versa Although described with reference to specific examples and drawings, modifications, additions and substitutions on example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

While inventive concepts have been described with reference to some example embodiments, it will be apparent to those skilled in the art that various changes and modifications may be made without departing from the spirit and scope of inventive concepts. Therefore, it should be understood that the above-discussed example embodiments are not limiting, but illustrative.

What is claimed is:

1. A conversation contents management method for a conversation contents management system including at least one processor and a memory, the conversation contents management method comprising:

obtaining conversation contents, the conversation contents including a plurality of conversation messages exchanged between conversation partners within a conversation between the conversation partners, the plurality of conversation messages included in a conversation screen displayed on a display;

setting a subset of the conversation contents as a conversation section based on input from a user indicating a selection of a first conversation message among the plurality of conversation messages as a conversation start point and a second conversation message among the plurality of conversation messages as a conversation end point, the input from the user received after obtaining the conversation contents, and the subset of the conversation contents including a subset of the plurality of conversation messages between the conversation start point and the conversation end point, the subset of the plurality of conversation messages including a conversation message including a uniform resource locator (URL);

identifying at least one of a conversation party or a conversation time included in the conversation section based on the input from the user;

sequentially providing
a first popup menu in response to a first long touch of the conversation start point, and
a second popup menu in response to a second long touch of the conversation end point, each of the first popup menu and the second popup menu being displayed over the conversation screen and including an option to save the conversation section;

storing, in the memory, as a unit conversation, the conversation section including the conversation party, the subset of the conversation contents, and the conversation time, based on activation of the option to save the conversation section included in one of the first popup menu or the second popup menu; and displaying the conversation section including the URL in a dedicated viewer having a viewer function, wherein the dedicated viewer provides a function providing an access to a web page of the URL in response to a selection of the URL in the dedicated viewer, and wherein the dedicated viewer provides first functions and second functions, the first functions enabling management of a plurality of management box folders containing a plurality of conversation sections, the conversation section being one among the plurality of conversation sections, the first functions including adding, revising and deleting one of the plurality of management box folders or one of the plurality of conversation sections, and the second functions including sharing, tagging and searching the conversation section.

2. The conversation contents management method of claim 1, wherein the storing comprises:
storing the conversation section as the unit conversation based on the conversation start point and the conversation end point.

3. The conversation contents management method of claim 1, wherein the conversation section includes the conversation start point as a selected area of the conversation screen.

4. The conversation contents management method of claim 1, further comprising:
selecting the conversation start point or the conversation end point in response to a touch operation on the conversation screen.

5. The conversation contents management method of claim 1, wherein the storing comprises:
storing the conversation section in a document format.

6. The conversation contents management method of claim 1, wherein the storing comprises:
storing data included in the conversation section in connection with the unit conversation.

7. The conversation contents management method of claim 1, wherein the storing comprises:
storing the conversation section as the unit conversation on a client configured to execute a messenger function.

8. The conversation contents management method of claim 1, further comprising:
calling at least one of a messenger service, a mail service, a messaging service, or a social networking service (SNS) for sharing the conversation section via the dedicated viewer.

9. The conversation contents management method of claim 1, further comprising:
creating a layout based on the conversation party and the conversation time; and wherein
the displaying displays the layout.

10. The conversation contents management method of claim 1, further comprising:
classifying and managing the conversation section through the dedicated viewer based on at least one reference;
creating and editing a management box folder for managing the conversation section;
searching for the conversation section;
deleting the conversation section;
associating a tag with the conversation section;
calling a messenger function for communicating with a party associated with the conversation section; and sharing the conversation section.

11. A non-transitory computer-readable storage medium including computer-executable instructions that, when executed, cause a conversation contents management system including at least one processor and a memory, to perform a conversation contents management method comprising:
obtaining conversation contents, the conversation contents including a plurality of conversation messages exchanged between conversation partners within a conversation between the conversation partners, the plurality of conversation messages included in a conversation screen displayed on a display;
setting a subset of the conversation contents as a conversation section based on input from a user indicating a selection of a first conversation message among the plurality of conversation messages as a conversation start point and a second conversation message among the plurality of conversation messages as a conversation end point, the input from the user received after obtaining the conversation contents, and the subset of the conversation contents including a subset of the plurality of conversation messages between the conversation start point and the conversation end point, the subset of the plurality of conversation messages including a conversation message including a uniform resource locator (URL);
identifying at least one of a conversation party or a conversation time included in the conversation section based on the input from the user;
sequentially providing
a first popup menu in response to a first long touch of the conversation start point, and
a second popup menu in response to a second long touch of the conversation end point, each of the first popup menu and the second popup menu being displayed over the conversation screen and including an option to save the conversation section;
storing, in the memory, as a unit conversation, the conversation section including the conversation party, the subset of the conversation contents, and the conversation time, based on activation of the option to save the conversation section included in one of the first popup menu or the second popup menu; and
displaying the conversation section including the URL in a dedicated viewer having a viewer function, wherein the dedicated viewer provides a function providing an access to a web page of the URL in response to a selection of the URL in the dedicated viewer, and
wherein the dedicated viewer provides first functions and second functions, the first functions enabling management of a plurality of management box folders containing a plurality of conversation sections, the conversation section being one among the plurality of conversation sections, the first functions including adding, revising and deleting one of the plurality of management box folders or one of the plurality of conversation sections, and the second functions including sharing, tagging and searching the conversation section.

12. A conversation contents management device comprising:
a memory having computer-readable instructions stored therein; and
at least one processor configured to execute the computer-readable instructions to
obtain conversation contents, the conversation contents including a plurality of conversation messages exchanged between conversation partners within a conversation between the conversation partners, the plurality of conversation messages included in a conversation screen displayed on a display, set a subset of the conversation contents as a conversation section based on input from a user indicating a selection of a first conversation message among the plurality of conversation messages as a conversation start point and a second conversation message among the plurality of conversation messages as a conversation end point, the input from the user received after obtaining the conversation contents, and the subset of the conversation contents including a subset of the plurality of conversation messages between the conversation start point and the conversation end point, the subset of the plurality of conversation messages including a conversation message including a uniform resource locator (URL), identify at least one of a conversation party or a conversation time included in the conversation section based on the input from the user, sequentially provide
 a first popup menu in response to a first long touch of the conversation start point, and
 a second popup menu in response to a second long touch of the conversation end point, each of the first popup menu and the second popup menu being displayed over the conversation screen and including an option to save the conversation section, store, in the memory as a unit conversation, the conversation section including the conversation party, the subset of the conversation contents, and the conversation time, based on activation of the option to save the conversation section included in one of the first popup menu or the second popup menu, and display the conversation section including the URL in a dedicated viewer having a viewer function, wherein the dedicated viewer provides a function providing an access to a web page of the URL in response to a selection of the URL in the dedicated viewer, and wherein the dedicated viewer provides first functions and second functions, the first functions enabling management of a plurality of management box folders containing a plurality of conversation sections, the conversation section being one among the plurality of conversation sections, the first functions including adding, revising and deleting one of the plurality of management box folders or one of the plurality of conversation sections, and the second functions including sharing, tagging and searching the conversation section.

13. The conversation contents management device of claim 12, wherein the at least one processor is configured to store, in the memory, the conversation section as the unit conversation in a document format.

14. The conversation contents management device of claim 12, wherein the at least one processor is further configured to store, in the memory, data included in the conversation section in connection with the unit conversation.

15. The conversation contents management device of claim 12, wherein the at least one processor is further configured to call at least one of a messenger service, a mail service, a messaging service, or a social networking service for sharing the conversation section via the dedicated viewer.

16. The conversation contents management device of claim 12, wherein the at least one processor is further configured to
 create a layout based on the conversation party and the conversation time; and
 display the layout via the dedicated viewer.

17. The conversation contents management device of claim 12, wherein the at least one processor is further configured to:
 classify and manage the conversation section through the dedicated viewer based on at least one reference;
 create and edit a management box folder for managing the conversation section;
 search for the conversation section;
 delete the conversation section;
 associate a tag with the conversation section;
 call a messenger function for communicating with a party associated with the conversation section; and
 share the conversation section.

18. A conversation contents management method for a conversation contents management system including at least one processor and a memory, the conversation contents management method comprising:
 obtaining conversation contents, the conversation contents including a plurality of conversation messages exchanged between conversation partners within a conversation between the conversation partners, the plurality of conversation messages included in a conversation screen displayed on a display;
 setting a subset of the conversation contents as a conversation section based on input from a user indicating a selection of a first conversation message among the plurality of conversation messages as a conversation start point and a second conversation message among the plurality of conversation messages as a conversation end point, the input from the user received after obtaining the conversation contents, and the subset of the conversation contents including a subset of the plurality of conversation messages between the conversation start point and the conversation end point, the subset of the plurality of conversation messages including a conversation message including a uniform resource locator (URL);
 sequentially providing
  a first popup menu in response to a first long touch of the conversation start point, and
  a second popup menu in response to a second long touch of the conversation end point, each of the first popup menu and the second popup menu being displayed over the conversation screen and including an option to save the conversation section;
 storing in the memory, or sharing, the conversation section based on activation of the option to save the conversation section included in one of the first popup menu or the second popup menu, the conversation section including a conversation party and the subset of the conversation contents; and
 displaying the conversation section including the URL in a dedicated viewer having a viewer function, wherein the dedicated viewer provides a function providing an access to a web page of the URL in response to a selection of the URL in the dedicated viewer, and
  wherein the dedicated viewer provides first functions and second functions, the first functions enabling management of a plurality of management box folders containing a plurality of conversation sections, the conversation section being one among the plurality of conversation sections, the first functions including adding, revising and deleting one of the plurality of management box folders or one of the plurality of conversation sections, and the second functions including sharing, tagging and searching the conversation section.

19. The conversation contents management method of claim 1, wherein tagged conversation sections among the plurality of conversation sections are contained in a first management box folder among the plurality of management box folders.

* * * * *